(12) United States Patent
Schubert et al.

(10) Patent No.: US 7,159,478 B2
(45) Date of Patent: Jan. 9, 2007

(54) PRETENSIONER TESTING APPARATUS AND METHOD

(75) Inventors: Robert J. Schubert, Oxford, MI (US); Timothy A. Gandee, Allenton, MI (US); David G. Ransom, Rochester Hills, MI (US)

(73) Assignee: Takata Seat Belts Inc., Auburn Hills, MI (US)

( * ) Notice: Subject to any disclaimer, the term of this patent is extended or adjusted under 35 U.S.C. 154(b) by 0 days.

(21) Appl. No.: 10/824,114

(22) Filed: Apr. 14, 2004

(65) Prior Publication Data

US 2005/0229726 A1 Oct. 20, 2005

(51) Int. Cl.
*G01M 19/00* (2006.01)

(52) U.S. Cl. ..................... 73/866.4; 73/865.9
(58) Field of Classification Search .............. 73/865.9, 73/866, 866.4; 280/801.1, 801.2, 802–808
See application file for complete search history.

(56) References Cited

U.S. PATENT DOCUMENTS

| | | | |
|---|---|---|---|
| 2,893,240 A | 7/1959 | Able | |
| 3,750,457 A | 8/1973 | Pascquet | |
| 4,052,883 A | 10/1977 | Turnas | |
| 4,630,472 A | 12/1986 | Zimmerman et al. | |
| 5,450,742 A | 9/1995 | Baltz et al. | |
| 5,466,002 A | 11/1995 | Tanaka et al. | |
| 5,564,748 A | 10/1996 | Kmiec et al. | |
| 5,639,120 A | 6/1997 | Kmiec et al. | |
| 5,697,642 A | 12/1997 | Gordon et al. | |
| 5,831,172 A | 11/1998 | Kidd | |
| 5,906,327 A * | 5/1999 | Chamings | 242/374 |
| 5,924,730 A | 7/1999 | Burrow et al. | |
| 6,149,242 A | 11/2000 | Pesta et al. | |
| 6,155,512 A | 12/2000 | Specht et al. | |
| 6,164,700 A | 12/2000 | Masuda et al. | |
| 6,213,513 B1 | 4/2001 | Grabowski et al. | |
| 6,264,281 B1 | 7/2001 | Dukatz et al. | |
| 6,460,794 B1 | 10/2002 | Stevens | |
| 6,520,443 B1 | 2/2003 | Stevens | |
| 6,585,295 B1 * | 7/2003 | Jernstrom | 280/806 |
| 6,698,677 B1 * | 3/2004 | Happ et al. | 242/374 |
| 2002/0088890 A1 | 7/2002 | Shih et al. | |
| 2002/0128761 A1 | 9/2002 | Kim et al. | |

* cited by examiner

*Primary Examiner*—Daniel S. Larkin
(74) *Attorney, Agent, or Firm*—Fitch, Even, Tabin & Flannery

(57) ABSTRACT

A test system is provided for simulating pre-tensioner systems that use pyrotechnic gas generators. In a preferred form, the test system includes a pneumatic cylinder energized by pressurized air from an accumulator and passing through a fast acting ball valve. A substantially linear relationship is established between accumulator pressure and the time rate of change of acceleration of a piston in the pneumatic cylinder. Use of the test system allows improved evaluation of seat belt systems employing pre-tensioners with pyrotechnic gas generators.

7 Claims, 3 Drawing Sheets

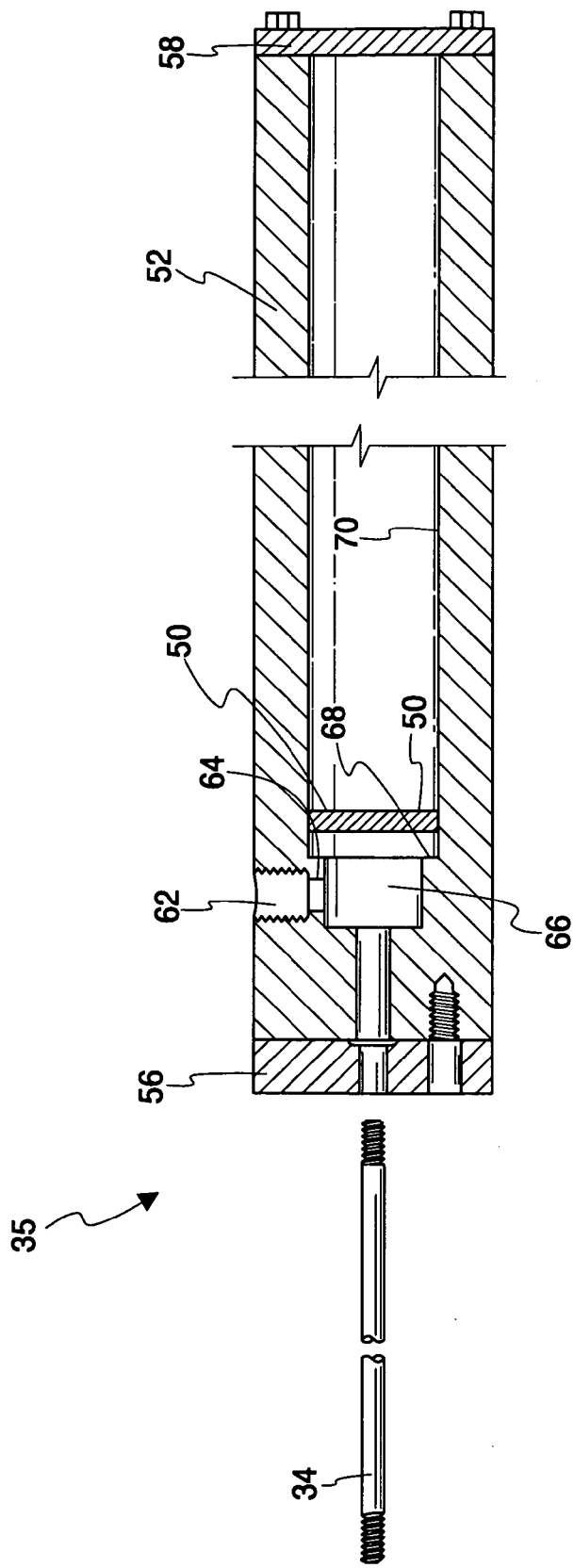

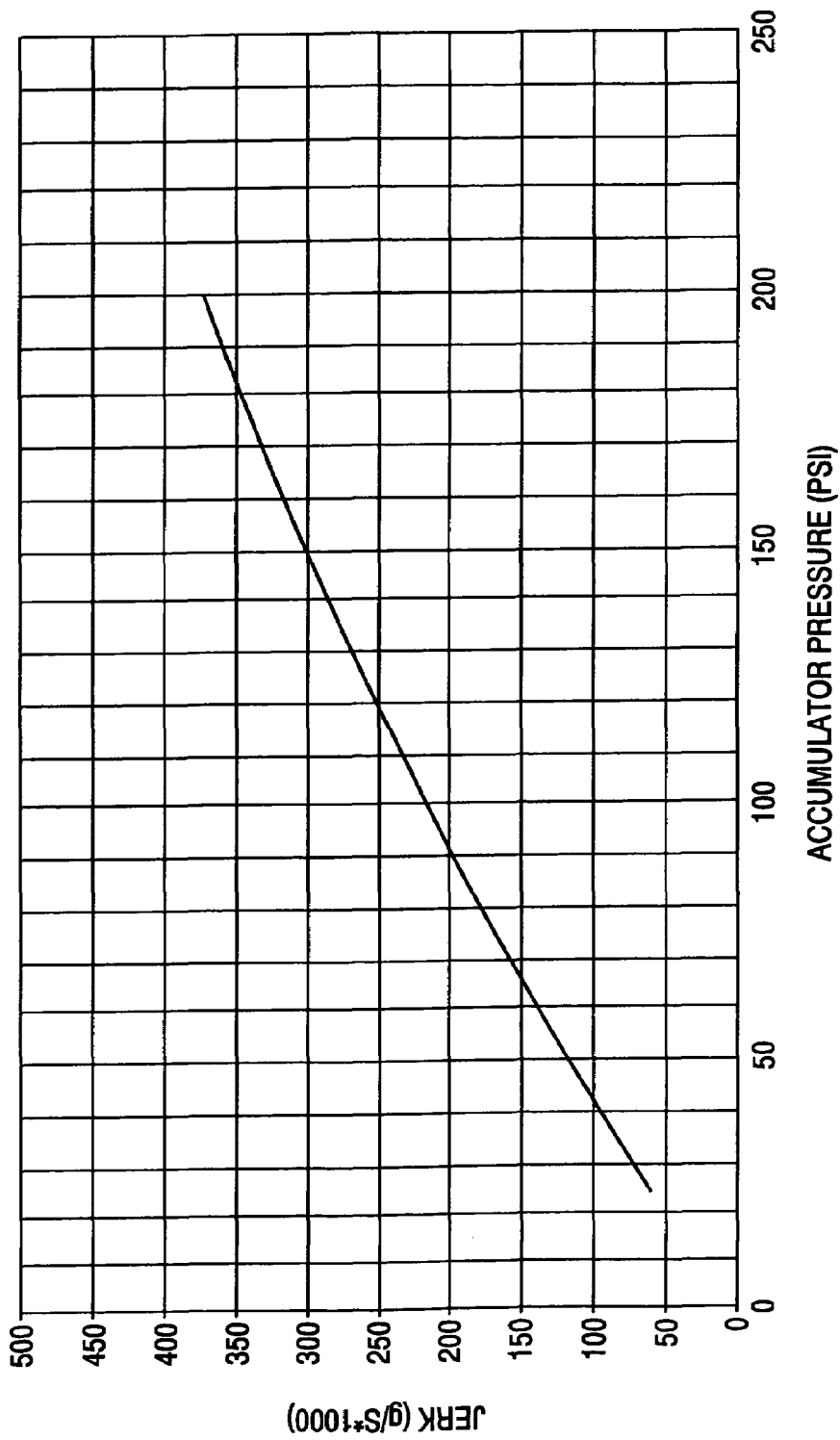

PRETENSIONER TESTING APPARATUS AND METHOD

FIELD OF THE INVENTION

The invention relates to restraint systems for vehicle occupants and, more particularly, to a testing apparatus and method for seat belt pretensioners.

BACKGROUND OF THE INVENTION

Improvements are continually being sought for seat belt pre-tensioner systems. One example of a pre-tensioner for a vehicular seat belt system is disclosed in U.S. Pat. No. 5,588,677 commonly owned by the Assignee of the present invention. The pre-tensioner includes a flexible draw element in the form of a wire cable, connected to the buckle part of a three-point seat belt system. The wire cable has a looped end secured to a roller in the buckle part. With one end of the loop portion secured against movement, a portion of the loop is pulled downwardly by a power operated device which includes a power operated piston attached to the cable. Typically, the power-operated device comprises a pyrotechnic gas generator that drives the piston a distance sufficient to remove slack from the seat belt system. The pulling force of the pre-tensioner on the buckle part is quite large, and is developed in a very short time. Operation of the power-operated device is typically triggered by an external sensor such as an acceleration sensor.

The system described above is but one of many pre-tensioner systems employing pyrotechnic gas generators. For example, the pretensioner can act on the buckle part, or instead can act directly on the belt webbing or the retractor in which it is wound. It is necessary in developing seat belt systems that various components and sub-systems be tested both individually and together to insure proper coordination in an emergency event where pre-tensioning is desired. In addition, the operation of components associated with the seat belt needs to be verified with different pretensioners. For instance, in typical three-point belt systems, the belt webbing is wound on a spool of a retractor that can include vehicle and/or web sensitive locking devices to stop belt payout from the retractor spool during emergency vehicle situations such as during high acceleration/deceleration conditions. The seat belt pathway can include an anchor along one side of the seat, a tongue and buckle connection at the other side of the side, and guide ring mounted generally at an elevated position in the vehicle passenger compartment such as to a B-pillar and/or to an adjustment mechanism for changing the position of the D-ring. When an emergency condition occurs, each of these components will generally experience higher stresses than during non-emergency conditions. It would be desirable to be able to identify how these components interact during high stress events.

In the course of developing a seat belt system, repetitive tests may be required with each test involving the firing of the pyrotechnic device. While it is desirable to avoid the complications associated with firing of pyrotechnic devices in a laboratory test condition, it is important that the testing accurately reflect the operating characteristics unique to the particular pyrotechnic devices in order to insure that the test conditions faithfully represent actual field-observable conditions of the seat belt system in operation.

SUMMARY OF THE INVENTION

In accordance with the present invention, a pneumatic test system emulates the operating conditions of pre-tensioners powered by pyrotechnic gas generators. A pneumatic test system or apparatus is provided including a pretensioner portion and a control or simulator portion that can accurately simulate the forces created by different types and sizes of pyrotechnic pretensionsers on a seat belt system. In this manner, the compatibility of other components, e.g., retractors, in the vehicle's restraint system with that of a particular pretension can be tested and validated.

In a preferred form of the test system, a pneumatic cylinder is fed a supply of pressurized air from an accumulator through a fast acting ball valve. A linear relationship is established between accumulator pressure and the time rate of acceleration which is generated by the cylinder and applied to pre-tension a seat belt system being evaluated. The pneumatic device accurately simulates the performance of conventional pyrotechnic gas generators without the safety, schedule or cost burdens associated with testing of the actual pyrotechnic devices themselves.

BRIEF DESCRIPTION OF THE DRAWINGS

FIG. 2 shows the pneumatic cylinder portion thereof on an enlarged scale; and

FIG. 3 is a graph showing transfer characteristics of the pneumatic test system.

DETAILED DESCRIPTION OF THE PREFERRED EMBODIMENTS

Figure 1:
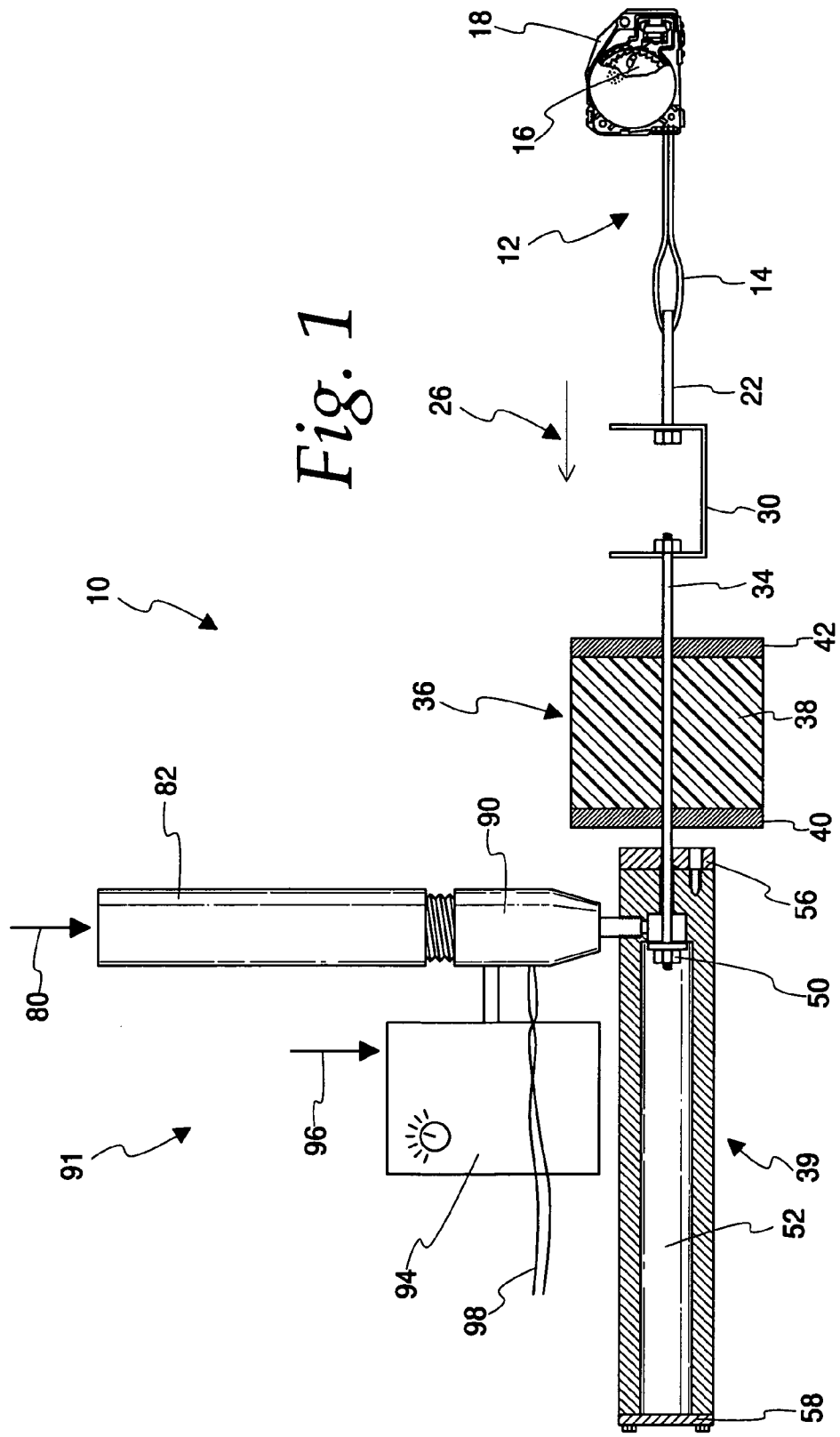
FIG. 1 is an elevational view, shown partly broken away, of a pneumatic test system.

Seat belt systems are provided within a vehicle for the safety of the various vehicle occupants. During normal operation of the vehicle, it is important that the passengers be provided with a measure of comfort. Accordingly, during normal vehicle operation the seat belts are allowed to rest with some slack so as to fit relatively loosely about the occupants body. In the event of a crash or other emergency event, the vehicle can undergo sudden deceleration with the occupants being propelled forward in their seats. The webbing supply for the seat belt systems is locked up or blocked to substantially prevent pay out of the seat belt webbing during the emergency event. In a crash event, sudden forces applied to the vehicle occupants can undesirably allow their movement due to the slack in the seat belt system.

Accordingly, a pre-tensioner is provided to act on the seat belt buckle, the webbing or the spool of a seat belt retractor to eliminate slack in the seat belt system just prior to or close to simultaneously with lock up of the spool. One popular arrangement for pre-tensioning seat belt systems involves a pyrotechnic energy source in the form of pyrotechnic materials and/or a rapidly expanding combustible gas. The combustible materials and/or gas is ignited and then gas is expanded in a cylinder to drive a piston along a linear path. The piston is coupled to a portion of the seat belt system such as the seat belt buckle or a portion of the seat belt webbing, or the retractor spool such that travel of the piston causes slack in the seat belt system to be taken up. Operation of the pre-tensioner system usually results in pulling the occupant toward the seat during initiation of a crash or other deceleration event. Typically, gas pressure developed by the pyrotechnic device is released after a time to allow piston travel sufficient for the passenger to regain a degree of movement, once the event is terminated. It will be appreciated that the entire time of the event is very short, on the order of milliseconds. Manufacturers of seat belt systems need to test various cooperating sub-systems associated with sensing of a deceleration event, triggering of the pyrotechnic device with attendant travel of the pre-tensioner piston, and lock up of the webbing supply spool. Generally, it is desirable for manufacturers of seat belt systems to engage in rigorous testing of a number of different seat belt systems including different operating components along the seat belt pathway as well as different seat belt pathways themselves, and each utilizing a variety of different pyrotechnic devices. With the present invention, the precise performance of the pyrotechnic devices can be simulated in a convenient, economical manner utilizing generally non-combustible pressurized air rather than pyrotechnic combustible materials.

With large numbers of seat belt systems in use, anomalous operating conditions are sometimes observed. A line of inquiry may be directed to the pyrotechnic device. Such devices are specified and purchased for a particular operating system, with the pyrotechnic operation carefully tailored to the demands of the particular combination of mechanical sub-systems. These subsystems, such as retractors for the seat belt webbing can include inertia or web-sensitive lock devices which can be subject to loading over a fairly high number of cycles that can change their tolerances and/or degree of sensitivity over time. The pretensioners employed with these retractors need to operate so that retractor locking stays effective despite any changes the retractor may experience due to their use in a vehicle.

As with other manufactured articles, pyrotechnic devices are constructed to deliver a specified level of performance within a stated operating range. Certain factors observed for anomalous seat belt system performance may lead the investigators to question whether the pyrotechnic device was operating near one end of its stated performance range. This, in combination with the behavior of mechanical systems operating in a peculiar situation may possibly have given rise to the anomalous performance of the seat belt system. In order to carry out this line of inquiry, a range of pyrotechnic performance must be made available to the investigators. Oftentimes, this requires investigation of only a particular portion of an acceptable performance range of a particular pyrotechnic device. The precision of specification of the pyrotechnic device required for testing may be far greater than that which is required for commercial purposes. The use of high precision pyrotechnic devices operating in a very narrow performance range would be prohibitively expensive and require prolonged time delays for procurement, unacceptable in a commercially competitive business. With the present invention, precise, narrow operating ranges of pyrotechnic devices can be emulated with a convenient, cost effective test arrangement.

Turning now to the drawings, and initially to FIG. 1, a pneumatic seat belt test system or test apparatus or stand is generally indicated at 10. A seat belt system 12 includes seat belt webbing 14 wound about a spool 16 of a retractor 18. The free end of the seat belt webbing 14 is secured to a tongue or latch plate 22. In a pretensioner test operation, the seat belt webbing 14 is pulled in the direction of arrow 26. The plate 22 is in turn connected to one end of a coupling 30 which joins the plate 22 to one end of a piston rod 34 of cylinder assembly 35. More generally, the piston cylinder assembly 35 is one form of a pretensioner portion 39 of the test system 10, as described herein. Coupling 30 can take virtually any form desired and in the illustrated embodiment comprises a steel bar bent into a U-shape.

Piston rod 34 passes through an emery dissipation or deceleration module generally indicated at 36. During a test program, piston rod 34, coupling 30, latch plate 22 and webbing 14 are very rapidly accelerated in the direction of arrow 26 (from right to left in FIG. 1). The testing provided by system 10 is dynamic in nature and a substantial amount of energy is imparted to the moving components. The moving components are rigidly linked together in the manner indicated and travel a relatively short distance. It is desirable to preserve the integrity of the test system for repeated use in subsequent test programs. Accordingly, it is desirable that some sort of deceleration capability be provided to cushion the moving parts, bringing them to a rest condition. Virtually any type of deceleration device could be used, such as hydraulic dash pots, tension and compression springs and other energy absorbing materials.

In the preferred embodiment, the deceleration module comprises a portion of resilient material such as high density foam 38 disposed between metal end plates 40, 42. Piston rod 34 travels through a continuous passageway formed through the deceleration module. As the rod 34 travels through the module 38 with the piston 50 being driven in direction 26, the U-shaped coupling member 30 will engage the end plate 42. Continued movement in direction 26 causes end plate 42 to compress the foam material 38 against fixed end plate 40. In this manner, the coupling 30 does not impact the pretensioner portion 39, and specifically adjacent end of the cylinder 50 during testing operations.

Piston rod 34 is connected to a piston 50 disposed within a pneumatic cylinder 52. The pneumatic cylinder 52 can take on various forms. By way of example and not limitation and referencing FIG. 2, cylinder 52 can have an approximate overall length of eleven inches and an internal axial bore 53 of approximately 0.787 inches. Piston 50 is dimensioned for a close tolerance fit within the pneumatic cylinder. Piston rod 34 has an approximate diameter of 0.25 inches and a length of approximately eighteen inches. Referring to FIG. 2, piston rod 34 travels through an end cap 56 affixed to one end of cylinder 52, that end being proximate deceleration module 36. The opposite end of pneumatic cylinder 52 is sealed with an end cap 58.

A transverse inlet aperture 62 extends radially and is located adjacent end cap 56 such as spaced axially approximately one inch therefrom. A reduced diameter portion 64 couples input aperture 62 to a cavity portion 66 which forms a shoulder face 68 with the enlarged bore wall 70 of the pneumatic cylinder. As mentioned, pneumatic cylinder 52 has an internal bore 53 of approximately 0.906 inches, slightly larger than the diameter of piston 50. Cavity portion 66 has a diameter of approximately 0.787 inches and an axial length of approximately 0.63 inches. Input aperture 62 has a diameter of 0.250". In preparation for a test firing, piston 52 is butted against shoulder face 68, enclosing cavity 66. A pulse of pneumatic actuating fluid or high pressure gas introduced in inlet 62 is briefly accumulated in cavity 66 and works against piston 52, causing the piston to travel toward end cap 58.

The high pressure gas such as air used for the test firing is introduced in the direction of arrow 80 into a housing 82 which functions as a storage tank of defined volume. The housing 82 allows a defined volume of high pressure gas to be accumulated therein in preparation for a test firing. The output of the accumulator 82 can be coupled in fluid communication to the input of the cylinder assembly 35 where pyrotechnic devices are normally located in conventional pyrotechnic pretensioner devices. In the preferred embodiment as set forth above with respect to the dimensions of the cylinder assembly 35, the housing or accumulator 82 has a length of 14 inches and an internal volume of 44 cubic inches. Preferably, the gas employed in the test firings comprises compressed air, although nitrogen or any other gaseous material can be employed, as desired. Internal pressure within accumulator 82 can be varied using conventional equipment, to provide a variety of test pressures in the accumulator. Preferably, test pressures up to approximately 3,500 psi are employed.

Imparting the source gas to the interior of pneumatic cylinder 52 involves a number of different parameters as are well understood in the art of fluid dynamics. For example, the source gas in accumulator 82 can be made to enter the input 62 of pneumatic cylinder 52 according to a controlled flow rate or a controlled velocity and these parameters can be controlled using conventional equipment, if desired. However, it has been found most important to successful operation of test system 10 that the onset or rise time of the pulse entering the pneumatic cylinder be made sufficiently fast so as to accurately emulate the operation of conventional pyrotechnic devices employed in seat belt restraint systems, and in particular with respect to the jerk forces (acceleration rate of change) generated by the cylinder 52. A valve 90 couples accumulator 82 to the input 62 of pneumatic cylinder 52. More generally, the accumulator 82 and the valve 90 cooperate to provide one form of a control or simulator portion 91 of the present testing system 10. It has been found important to provide a valve 90 having minimum fast acting characteristics to allow the control portion 91 of the system 10 herein to accurately simulate forces on the seat belt system 12 that would be developed during operation of a pyrotechnic pretensioner device. To this end, the preferred valve 90 is of a fast acting ball valve type which transitions from a fully closed position to a fully open position in approximately 7–8 milliseconds. In this manner, the control portion 91 of the system 10 is able to deliver the actuator fluid or air to the pretensioner portion 39 in a manner simulating the use of a pyrotechnic charge without need for a pyrotechnic gas generator. Valve operating times ranging between 5 milliseconds and 10 milliseconds are most preferred, and correspond to the performance indicated in FIG. 3. Valve 90 in the preferred embodiment is commercially available from Dwyer Instruments, Inc. of Michigan City, Ind. as Model No. 3060-99.

As mentioned, various flow characteristics of the source gas stored in accumulator 82 could be chosen for operation of test system 10. At first, the pneumatic input to cylinder 52 was set up to provide controlled velocities of seat belt travel, with webbing speeds in the 9 meter per second to 14 meter per second range. Merely controlling velocity of the seat belt webbing was found to produce unacceptable results. Attention was then turned to controlling higher order derivatives of webbing displacement with respect to time. Second and third order derivatives of displacement (i.e., velocity and acceleration) were found to yield unacceptable results. It was then determined that a fourth order derivative of displacement with respect to time, technically referred to as "jerk" was found to be the controlling parameter needed for successful emulation of pyrotechnic devices used in seat belt retention systems. Using conventional solid state accelerometer test devices the time rate of change of acceleration or jerk of seat belt systems undergoing testing in system 10 was measured between 1000 and 1,000,000 g/Sec., with a most preferred operation range between 50,000 and 375,000 g/sec. As stated, it was found that the jerk value imparted to the seat belt systems undergoing testing was the best parameter for accurate emulation of seat belt system pyrotechnic devices. It was found in conducting a wide range of tests with the present test apparatus 10, that the jerk value applied to the seat belt undergoing testing by piston 50 and piston rod 34 was substantially linearly related to the pressure of the source gas in accumulator 82 (see FIG. 3). An infinitely variable range of seat belt system pyrotechnic devices, not possible with discrete pyrotechnic devices could be simply and economically emulated by varying the pressure of the actuator fluid stored in accumulator 82. Thus, in one aspect, the present test apparatus 10 makes possible the emulation of pyrotechnic pre-tensioning devices within a narrow subset of their commercial operating range. In one instance, anomalous performance of a seat belt system and pyrotechnic device combination which occurs with a probability of approximately 0.05% was tested by varying the jerk value imparted to the seat belt system in steps of approximately 10,000 g/second, a testing program which could not be carried out heretofore utilizing pyrotechnic devices of unusually high precision not readily commercially available.

Valve 90 of the preferred embodiment is operated upon a concurrence of two input conditions. A pre-load is applied to valve 90 by a pneumatic signal developed by regulator 94 of the test apparatus control portion 91. Regulator 94 receives air flow in the direction of arrow 96 from a pressure source (not shown). With a pre-load applied to valve 90 by regulator 94, triggering of the valve is accomplished with a suitable electrical signal applied to input conductors 98. The combination of pre-load and triggering signals was found to provide sufficiently fast action of valve 90 to impart a sufficiently steep onset or rise time to the pressure pulse applied to piston 50 located within pneumatic cylinder 52. The opening times of valve 90 need not be measured directly, since attachment of the desired jerk amplitude provides an empirical indication that sufficiently fast valve times are being attained. Accordingly, the present system control or simulator portion 91 including fast acting valve 90 is effective to allow the jerk forces such as provided by different pretensioners having different performance characteristics to be accurately simulated for testing purposes.

As indicated above, seat belt pre-tensioning systems may engage different portions of a seat belt/retractor system in order to take up slack upon detection of an emergency event. Common pre-tensioner arrangements engage either the seat belt buckle, the seat belt webbing or the take up spool of the retractor. Each of these different modes of pre-tensioner systems can be readily accommodated by pneumatic test systems according to principles of the present invention, oftentimes without requiring modification to the seat belt system or its various components.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:
1. A testing apparatus for simulating forces generated by pyrotechnic devices on a seat belt system, the testing apparatus comprising:
   a pretensioner portion coupled to the seat belt system;
   actuating fluid for being supplied to the pretensioner portion;

a control portion that stores the actuating fluid at predetermined pressures selected to deliver the fluid to the pretensioner portion for simulating performance characteristics of pyrotechnic devices on the seat belt system;

an energy dissipation module between the seat belt system and the pretension portion to prevent impacts against the pretensioner portion during testing operations, wherein the seat belt system includes a coupling member and the pretensioner portion includes a piston rod attached to the coupling member and extending through the energy dissipation module.

2. The testing apparatus of claim 1 wherein the control portion includes a housing containing the actuating fluid, and a fast-acting valve that controls fluid flow between the housing and the pretensioner portion.

3. The testing apparatus of claim 2 wherein the fast-acting valve shifts between open and closed positions in approximately seven to eight milliseconds.

4. The testing apparatus of claim 2 wherein the fast acting valve includes a regulator therefor with the regulator applying a pneumatic signal to the valve.

5. The testing apparatus of claim 2 wherein the housing comprises an accumulator with the accumulator and the fast-acting valve being operable so that the pretensioner portion generates controlled jerk forces on the seat belt system, and the accumulator allows the actuating fluid to be contained under different predetermined pressures therein with the pressures selected to provide predetermined jerk forces to the seat belt system in the pretensioner portion.

6. The testing apparatus of claim 5 wherein the accumulator and the fast-acting valve are operable so that the selected fluid pressure in the accumulator is a linear function of the jerk force applied to the seat belt system via the pretensioner portion.

7. The testing apparatus of claim 1 wherein the actuating fluid is compressed air.

* * * * *